(12) United States Patent
Ford

(10) Patent No.: US 8,202,595 B2
(45) Date of Patent: Jun. 19, 2012

(54) ROLLED SHIELDING AND INSULATING MATERIAL

(75) Inventor: Richard H. Ford, Braselton, GA (US)

(73) Assignee: Pak-Lite, Inc., Suwanee, GA (US)

( * ) Notice: Subject to any disclaimer, the term of this patent is extended or adjusted under 35 U.S.C. 154(b) by 322 days.

(21) Appl. No.: 12/613,373

(22) Filed: Nov. 5, 2009

(65) Prior Publication Data

US 2011/0104421 A1  May 5, 2011

(51) Int. Cl.
*B32B 9/00* (2006.01)
*B32B 33/00* (2006.01)
*B32B 3/00* (2006.01)

(52) U.S. Cl. .............. 428/40.1; 428/57; 428/58

(58) Field of Classification Search ............... 428/40.1, 428/40.3, 41.3, 57, 99, 141, 156, 189, 195.1
See application file for complete search history.

(56) References Cited

U.S. PATENT DOCUMENTS

2011/0104484 A1 * 5/2011 Ford .................. 428/351
2012/0073731 A1 * 3/2012 Ford .................. 156/192

* cited by examiner

*Primary Examiner* — Patricia Nordmeyer
(74) *Attorney, Agent, or Firm* — Bryan W. Bockhop; Bockhop & Associates, LLC

(57) ABSTRACT

A shielding material includes a non-conductive sheet, an elongated adhesive strip and a conductive sheet. The elongated adhesive strip is disposed on a first side of the non-conductive sheet. The adhesive strip is spaced apart from a first edge of the non-conductive sheet and includes a removable cover film that protects the elongated adhesive strip until it has been removed. The conductive sheet is adhered to a second side of the non-conductive sheet. A first end of the conductive sheet is spaced apart from the first edge of the non-conductive sheet so that a first portion of the conductive sheet extends beyond the first edge of the non-conductive sheet. The conductive sheet is also disposed relative to the non-conductive sheet so that the second end is parallel to a second edge and so that a second portion of the non-conductive sheet extends beyond the second end.

14 Claims, 2 Drawing Sheets

ROLLED SHIELDING AND INSULATING MATERIAL

BACKGROUND OF THE INVENTION

1. Field of the Invention

The present invention relates to shielding materials and, more specifically, to a modular shielding material.

2. Description of the Prior Art

Magnetic Resonance Imaging (MRI) is widely employed in medical imaging to show the internal structure of the human body. MRI employs a powerful magnetic field to align the nuclear magnetization of hydrogen atoms in bodily fluids including water. Once aligned, radio frequency fields alter the alignment of this magnetization, which causes the nuclei in the bodily fluids to produce rotating magnetic fields detectable by a scanner. A computer uses the information sensed by the scanner to generate an image of the body portion of interest.

The powerful magnetic field required to operate an MRI system can interfere with nearby pieces of electronic equipment. Given that MRI systems are used in hospital systems that employ many other pieces of critical electronic equipment, proper electromagnetic shielding of any room housing MRI equipment is necessary to protect such other pieces of electronic equipment.

Typically, shielding of an MRI room involves first attaching a static electricity barrier (such as fiberglass sheeting, tar paper, or rubber sheet material) to the walls, ceiling and floor of the room. This static electricity barrier acts as an insulator to prevent static charge induced by the MRI system from leaving the room. Next, sheets of a conductive material (such as copper) are applied to the static electricity barrier, soldered together and then grounded. Flooring, wall material and ceiling materials are then placed inside of the conductive material.

This method is labor intensive and can result in substantial waste, since the conductive material is cut independently from the static electricity barrier. Also, fitting and attaching these materials independently can waste a considerable amount of time.

Therefore, there is a need for a shielding material and system for applying the shielding material that reduces the waste associated with the existing methods and that reduces the amount of time necessary to install the shielding materials.

SUMMARY OF THE INVENTION

The disadvantages of the prior art are overcome by the present invention which, in one aspect, is a shielding material that includes a non-conductive sheet, an elongated adhesive strip and a conductive sheet. The non-conductive sheet has a first side and an opposite second side, and defines a first edge and an opposite second edge. The elongated adhesive strip is disposed on the first side of the non-conductive sheet. The adhesive strip is spaced apart from and parallel to the first edge of the non-conductive sheet. The elongated adhesive strip includes a removable cover film that protects the elongated adhesive strip until the cover film has been removed. The conductive sheet is adhered to the second side of the non-conductive sheet. The conductive sheet has a first end and an opposite second end. The conductive sheet is disposed relative to the non-conductive sheet so that the first end is spaced apart from and parallel to the first edge of the non-conductive sheet and so that a first portion of the conductive sheet extends beyond the first edge of the non-conductive sheet. The conductive sheet is also disposed relative to the non-conductive sheet so that the second end is parallel to the second edge and so that a second portion of the non-conductive sheet extends beyond the second end.

In another aspect, the invention is a shielded surface that includes a first panel and a second panel of a shielding material disposed along the surface. Each of the first panel and the second panel includes a non-conductive sheet, an elongated adhesive strip and a conductive sheet. The non-conductive sheet has a first side and an opposite second side and defines a first edge and an opposite second edge. The elongated adhesive strip is disposed on the first side of non-conductive sheet. The adhesive strip is spaced apart from and parallel to the first edge of non-conductive sheet. The conductive sheet is adhered to the second side of non-conductive sheet. The conductive sheet has a first end and an opposite second end, and is disposed relative to non-conductive sheet so that the first end is spaced apart from and parallel to the first edge of non-conductive sheet and so that a first portion of the conductive sheet extends beyond the first edge of non-conductive sheet. The conductive sheet is also disposed relative to non-conductive sheet so that the second end is parallel to the second edge and so that a second portion of non-conductive sheet extends beyond the second end. The first panel is disposed relative to the second panel so that the first portion of the first panel extends below the elongated adhesive sheet of the second panel so that the first panel is adhered to the second panel. The first panel is also disposed relative to the second panel so that the second portion of the second panel overlaps the conductive sheet of the panel sheet. A bead of solder conductively adheres the conductive sheet of the first panel to the second portion of the second panel.

In yet another aspect, the invention is a method of making a shielding material in which a vapor barrier film is extruded onto a non-conductive sheet. An elongated adhesive strip is applied onto the vapor barrier film adjacent to a first edge thereof. The elongated adhesive strip includes a removable cover film that protects the elongated adhesive strip until the cover film has been removed. An adhesive layer is applied to a side of the non-conductive sheet that is opposite the vapor barrier film. A conductive sheet is applied to the adhesive layer so that a first portion of the conductive sheet extends beyond the non-conductive sheet and so that a second portion of the non-conductive sheet, disposed oppositely from the first portion, extends beyond the conductive sheet.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
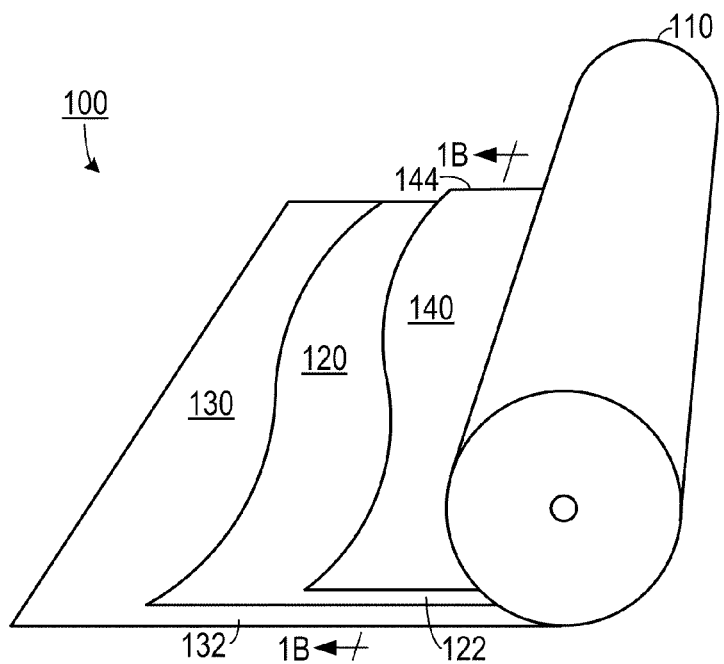
FIG. 1A is a perspective view of a roll of a shielding material.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIGS. 1A-D, one embodiment of a shielding material 100 includes a non-conductive sheet material 120, such as masticated rubber, and a vapor barrier film 130 that is extruded onto a first side of the non-conductive sheet material 120. Adhered to a second side of the non-conductive sheet material 120 is a conductive sheet 140, including a conductive material such as copper, aluminum, lead or galvanized steel. An adhesive strip 134 is applied to the vapor barrier film 130. The adhesive strip 134 includes a peel-off protective cover film that prevents the adhesive strip 134 from sticking to other objects until the protective cover film has been removed.

In one embodiment, masticated rubber is used as the non-conductive sheet material 120 in which the masticated rubber has a thickness of approximately 3.0 mm. Such material is available from, for example, RB Rubber Products, Inc., 904 NE 10th Avenue, McMinnville, Oreg. 97128. Masticated rubber works well because it is robust enough to withstand soldering without unacceptable deformation, it will not transmit a static charge therethrough and it provides good sound insulation. Other materials (e.g. fiberglass) having these qualities could also be used as a non-conductive sheet material 120. In one embodiment, copper used as the conductive sheet 140 is about 0.007 inches thick and can be procured from one of many sheet copper sources. Typically, the copper sheet used in shielding walls should be at least 0.005 inches thick and the copper sheet used in shielding floors should be at least 0.007 inches thick. In many applications, there is no need for copper greater than 0.010 inches thick.

The conductive sheet 140 has a first end 142 and an opposite second end 146. The first end 142 is spaced apart from a first edge 124 of the non-conductive sheet 120. Also, a first portion 144 of the conductive sheet extends beyond the first edge 124 of the non-conductive sheet 120. The second end 146 of the conductive sheet 140 is parallel to a second edge 126 of the nonconductive sheet 120 so that a second portion 122 of the non-conductive sheet 120 extends beyond the second end 146 of the conductive sheet 140.

The vapor barrier film 130 includes a portion 132 that extends beyond the second edge 126 the non-conductive sheet material 120. The vapor barrier film 130 could include a material such as polyethylene, polypropylene, or combinations thereof.

Figure 1B:
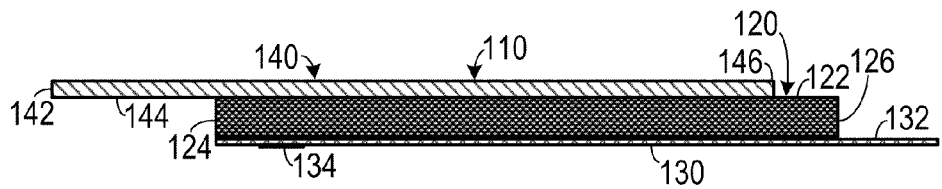
FIG. 1B is a cross sectional view of a portion of the shielding material shown in FIG. 1A, taken along line 1B-1B.
Figure 1C:
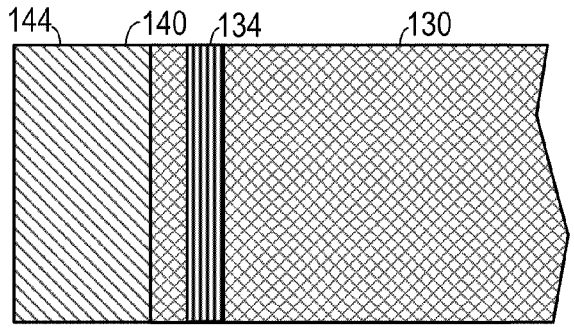
FIG. 1C is a bottom plan view of a piece of shielding material as shown in FIG. 1B viewing a first end portion.
Figure 1D:
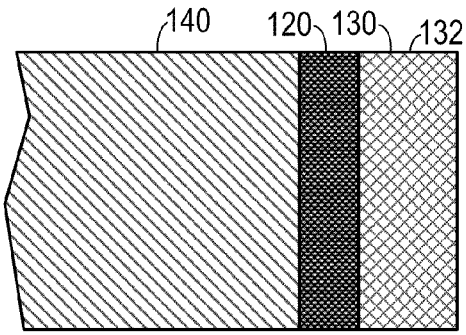
FIG. 1D is a top plan view of a piece of shielding material as shown in FIG. 1B viewing a second end portion.

The resulting shielding material 100 can be rolled into a roll (as shown in FIG. 1A), which can be cut into individual panels at the work site, or it can be delivered in individual flat panels (as shown in FIG. 1B-D).

Figure 2:
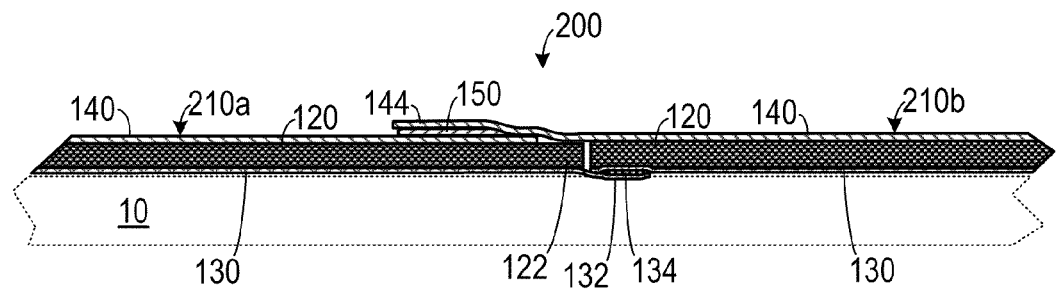
FIG. 2 is a cross sectional view of a surface and two units of shielding material applied thereto.

In use, as shown in FIG. 2, individual panels of the shielding material can be brought together to form a continuous shielding surface 200 that covers a surface 10 such as a wall, a floor or a ceiling. A first panel 210a is applied to the surface 10 and then the peel-off protective cover film associated with the adhesive strip 134 of a second panel 210 is removed. The second panel 210b is then placed against the first panel 210a so that the adhesive strip 134 of the second panel adheres to the portion 132 of the vapor barrier 130 of the first panel 210a that extends beyond the second edge 126 the non-conductive sheet material 120, thus forming a continuous vapor seal across both panels. The first portion 144 of the conductive sheet 140 that extends beyond the first edge 124 of the non-conductive sheet 120 of the second panel 210b is placed against the conductive sheet 140 of the first panel 210a and a bead of solder 150 is melted therebetween so that the conductive sheet 140 of the first panel 210a is adhered to and is in continuous electrical communication with the conductive sheet 140 of the second panel 210b. Once the entire surface 10 is shielded, a decorative material (not shown) may be applied to the conductive sheet 140 for the sake of aesthetics. For example, wall material or flooring can be applied directly to the conductive sheet 140.

Figure 3A:
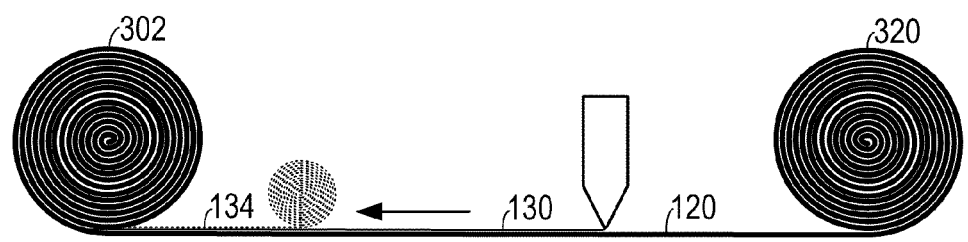
FIG. 3A is a schematic view showing a first action employed in making shielding material.
Figure 3B:
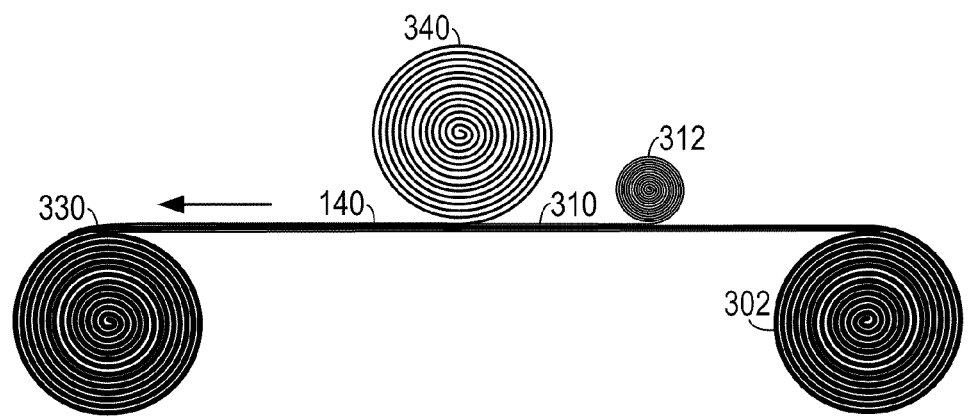
FIG. 3B is a schematic view showing a second action employed in making shielding material.

As shown in FIGS. 3A and 3B, one embodiment of a method of making a shielding material includes extruding a vapor barrier film 130 onto a non-conductive sheet material 120 as it is being unrolled from a first roll 320. The adhesive strip 134 is applied to the vapor barrier film 130 and the material rolled up into a second roll 302. The second roll 302 is then unrolled and an adhesive 310 (such as a pressure sensitive adhesive) from an adhesive roll 312 is applied thereto. The conductive sheet 140 from a roll 340 of conductive sheet material is applied to the adhesive 310 and the resulting shielding material 330 is either rolled up or cut into individual panels.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A shielding material, comprising:
   a. a non-conductive sheet having a first side and an opposite second side and defining a first edge and an opposite second edge, the non-conductive sheet including:
      i. a non-conductive sheet material; and
      ii. a vapor barrier film extruded thereon, wherein the vapor barrier film includes a portion that extends beyond the non-conductive sheet material adjacent to the second edge;
   b. an elongated adhesive strip disposed on the first side of the non-conductive sheet, the adhesive strip spaced apart from and parallel to the first edge of the non-conductive sheet, the elongated adhesive strip including a removable cover film that protects the elongated adhesive strip until the cover film has been removed, the elongated adhesive strip configured to adhere to a portion of the vapor barrier film of an adjacent non-conductive sheet; and
   c. a conductive sheet adhered to the second side of the non-conductive sheet, the conductive sheet having a first end and an opposite second end, the conductive sheet disposed relative to the non-conductive sheet so that the first end is spaced apart from and parallel to the first edge of the non-conductive sheet and so that a first portion of the conductive sheet extends beyond the first edge of the non-conductive sheet, the conductive sheet also disposed relative to the non-conductive sheet so that the second end is parallel to the second edge and so that a second portion of the non-conductive sheet extends beyond the second end.

2. The shielding material of claim 1, wherein the non-conductive sheet material comprises masticated rubber.

3. The shielding material of claim 1, wherein the vapor barrier film comprises a material selected from a group consisting of: polyethylene; polypropylene; and combinations thereof.

4. The shielding material of claim 1, wherein the conductive sheet comprises a material selected from a group consisting of: copper; aluminum; lead; galvanized steel; and combinations thereof.

5. The shielding material of claim 1, further comprising a pressure sensitive adhesive disposed between the non-conductive sheet and the conductive sheet.

6. The shielding material of claim 1, formed into a roll.

7. The shielding material of claim 1, formed into a plurality of panels.

8. A shielded surface, comprising:
 a. a first panel and a second panel of a shielding material disposed along the surface, wherein each of the first panel and the second panel includes:
  i. a non-conductive sheet having a first side and an opposite second side and defining a first edge and an opposite second edge;
  ii. an elongated adhesive strip disposed on the first side of non-conductive sheet, the adhesive strip spaced apart from and parallel to the first edge of non-conductive sheet; and
  iii. a conductive sheet adhered to the second side of non-conductive sheet, the conductive sheet having a first end and an opposite second end, the conductive sheet disposed relative to non-conductive sheet so that the first end is spaced apart from and parallel to the first edge of non-conductive sheet and so that a first portion of the conductive sheet extends beyond the first edge of non-conductive sheet, the conductive sheet also disposed relative to non-conductive sheet so that the second end is parallel to the second edge and so that a second portion of non-conductive sheet extends beyond the second end,
  the first panel disposed relative to the second panel so that the first portion of the conductive sheet of the first panel extends beyond the second end of the conductive sheet of the second panel and so that the adhesive strip of the non-conductive sheet of the first panel is adhered to the non-conductive sheet of the second panel; and
 b. a bead of solder that conductively adheres the first portion of the conductive sheet of the first panel to the conductive sheet of the second panel.

9. The shielded surface of claim 8, wherein non-conductive sheet comprises:
 a. a non-conductive sheet material; and
 b. a vapor barrier film extruded thereon.

10. The shielded surface of claim 9, wherein the non-conductive sheet material comprises masticated rubber.

11. The shielding material of claim 9, wherein the vapor barrier film includes a portion that extends beyond the non-conductive sheet material adjacent to the second edge.

12. The shielded surface of claim 9, wherein the vapor barrier film comprises a material selected from a group consisting of: polyethylene; polypropylene; and combinations thereof.

13. The shielded surface of claim 8, wherein the conductive sheet comprises a material selected from a group consisting of: copper; aluminum; lead; galvanized steel; and combinations thereof.

14. The shielded surface of claim 8, further comprising a pressure sensitive adhesive disposed between the non-conductive sheet and the conductive sheet.

* * * * *